United States Patent [19]

Savill

[11] Patent Number: 5,386,955
[45] Date of Patent: Feb. 7, 1995

[54] CONTROL OF FLUID FLOW

[75] Inventor: Anthony M. Savill, Cambridge, England

[73] Assignee: Rolls-Royce plc, London, England

[21] Appl. No.: 794,372

[22] Filed: Nov. 14, 1991

Related U.S. Application Data

[63] Continuation-in-part of Ser. No. 670,520, Mar. 18, 1991, abandoned, which is a continuation of Ser. No. 493,450, Mar. 14, 1990, abandoned, which is a continuation of Ser. No. 372,153, Jun. 27, 1989, Pat. No. 4,930,729, which is a continuation of Ser. No. 52,867, May 22, 1987, abandoned.

[30] Foreign Application Priority Data

| May 22, 1986 | [GB] | United Kingdom | 8612485 |
| May 22, 1986 | [GB] | United Kingdom | 8612486 |
| May 22, 1986 | [GB] | United Kingdom | 8612487 |
| Mar. 19, 1987 | [GB] | United Kingdom | 8706554 |

[51] Int. Cl.$^6$ ............................................. B64C 21/10
[52] U.S. Cl. .................................... 244/200; 138/38; 244/199; 244/130
[58] Field of Search .............. 244/200, 130, 199, 198, 244/204; 138/37, 38

[56] References Cited

U.S. PATENT DOCUMENTS 4,650,138 3/1987 Grou .................................. 244/200
4,786,016 11/1988 Presz, Jr. et al. .

FOREIGN PATENT DOCUMENTS 0216384 9/1986 European Pat. Off. .
205289 12/1986 European Pat. Off. .
718498 11/1954 United Kingdom .

OTHER PUBLICATIONS

AIAA-83-0230—An Experimental Study of Changes in the Structure of a Turbulent Boundary Layer Due to Surface Geometry Changes; Hooshmand et al., Jan. 1983.
AIAA 12th Aerospace Sciences Meeting—Turbulent Boundary Layer Drag Reduction Using Riblets; Walsh, Jan. 1982.
AIAA 22nd Aerospace Sciences Meeting—Optimization and Application of Riblets for Turbulent Drag Reduction; Walsh et al., Jan. 1984.
ICAS '86—Paper No. 86-1.3—Drag Reduction Mechanisms Derived from Shark Skin; Bechert et al; Sep. 1986.
AIAA'83—AIAA-83-0227, Turbulent Drag Reduction for External Flows, D. M. Bushnell, p. 6, lines 16-64.
Mechanical Engineering, vol. 103, No. 3, Mar. 1981, p. 71, Grooves Reduce Aircraft Drag.
European Search Report Sep. 1987.

*Primary Examiner*—Galen L. Barefoot
*Attorney, Agent, or Firm*—Cushman, Darby & Cushman

[57] ABSTRACT

To modify a turbulent boundary layer flow over a surface to reduce its drag, a series of streamwise riblet projections is provided on the surface arranged in a pattern consisting of spaced larger height projections between which are a plurality of smaller height projections The latter inhibit turbulent eddy motions from penetrating deep into the grooves between them and so displace the turbulent motion away from the wall. The larger projections control the longitudinal vortices or streaks that are characteristic of turbulent boundary layer flow and promote energy transfer to the smaller scale secondary vortices associated with the smaller projections. In another configuration the projections are arranged in a repeated spanwise pattern in which the adjacent projections in each pattern repeat project to different heights, the different heights being so scaled in relation to each other and to the boundary layer thickness that the displacement of the turbulent motion away from the surface by the smaller height projections is extended further by the larger height projections. A further possibility lies in increasing the heights, and possibly also the pitches, of the projections progressively in the downstream direction to mitigate the self-limiting effect of the projections as they establish a raised virtual wall surface for the turbulent boundary layer, the increase being made, continuously or in one or more steps.

25 Claims, 7 Drawing Sheets

CONTROL OF FLUID FLOW

This application is a continuation-in-part of application Ser. No. 07/670,520, filed Mar. 18, 1991, abandoned, and which in turn is a continuation of Ser. No. 07/493,450, filed Mar. 14, 1990, now abandoned, which is in turn a continuation of Ser. No. 07/372,153, filed Jun. 27, 1989, now U.S. Pat. No. 4,930,729, Granted Jun. 5, 1990, and which is a continuation of Ser. No. 52,867, filed May 22, 1987, now abandoned.

FIELD OF THE INVENTION

This invention is concerned with the modification of boundary layer flows over fluid dynamic surfaces, which may be fluid dynamic surfaces. It is particularly concerned with the use of small-size surface projections (so-called "riblets") to reduce drag by controlling interaction of a boundary-layer of the flow with the surface.

BACKGROUND OF THE INVENTION

There have been many investigations in recent years of the effects that small-geometry surface configurations can have on turbulent boundary layers. Particular attention has been paid to the provision of so-called riblet surfaces in which an array of small longitudinal ribs extend over the turbulent boundary layer region of a surface in the direction of fluid flow over the surface, to reduce momentum transport or drag. Experimental results indicate that net or surface drag reductions of up to about 7% can be achieved.

In a paper "Drag Characteristics of V-Groove and Transverse Curvature Riblets" (presented by M. J. Walsh at the Symposium on Viscous Drag Reduction, Dallas, Tex., Nov. 7-8, 1979) reference is made to an early investigation (1966) by Liu, Kline, and Johnston in which drag reductions of 3-4% were obtained by reducing the turbulent bursting rate (i.e. the rate of break-up of the low speed longitudinal vertices or "streaks" that characteristically form in a turbulent boundary layer flow close to a wall) by employing rectangular fins. Walsh's paper reports the investigation of a number of alternative rib profiles and states he was able to obtain a maximum drag reduction of 7% using V-groove riblets.

In the prior art and later in this specification the word streak is often used to refer to longitudinal vertices, although strictly speaking a streak is merely the visible manifestation of vertices in smoke tunnel experiments.

The drag reduction may be associated with the ability of the riblets to limit random spanwise movements of the streaks, as has been suggested by a number of sources, e.g. R. E. Falco (AIAA-83-0377, AIAA 21st Aerospace Sciences Meeting, Jan. 10-13 1983, Reno, Nev.). Johansen and Smith (AIAA-85-0547, AIAA-Shear Flow Control Conference, Mar. 12-14, 1985, Boulder, Colo.) have shown that cylindrical riblets of a smaller height than the V-groove riblets with which Walsh obtained his optimum results, may have the effect of anchoring and/or creating sites of low-speed streaks in a limited region above the wall surface, but their experiments also showed drag increases of 3% to 8%. It has been attempted to follow Johansen and Smith by using blade-like riblets to anchor or create low-speed streaks by the use of riblets and then use V-groove riblets between the streak anchors to control bursting, but no improvement in net drag reduction has been reported ("Progress in Astronautics & Aeronautics", Vol. 123; and S. P. Wilkinson, J. B. Anders, B. S. Lazos & D. M. Bushnell "Turbulent Drag Reduction at NASA Langley: Progress & Plans", Royal Aeronautical Society International Conference on Drag Reduction by Passive Means, Vol. 1, Page 1, 1987: RAeS; and "Riblets" by M. J. Walsh in "Viscous Drag Reduction in Boundary Layers", Ed. D. M. Bushnell & J. N. Heffner).

The results reported from these and other previous investigations all showed that although the effect of riblets may be beneficial, it is rather small for practical purposes, and that has led to the search for alternative geometries and combinations of techniques offering larger benefits.

Thus it has been proposed (U.S. Pat. No. 4,706,910 of M. J. Walsh et al) to reduce skin friction more effectively by providing a riblet surface with superimposed large-eddy break-up devices (LEBU's) as manipulators for the outer region of the boundary layer, but such an arrangement adds considerable complexity and is susceptible to wear and especially accidental damage. In another proposal ("On the Drag Reduction of the Shark Skin", Bechert, Hoppe and Reif, AIAA-85-0546) it has been suggested that it may be appropriate to use so-called vortex generator surfaces which are configured so as to produce tangential mixing using local flow conditions over a ridge-pattern structure analogous to the configuration of scales on a shark's skin. It is claimed that this could lead to greater drag reduction, but it would also be inherently complicated and difficult to build up a simulation of the scaly surface that the investigators have concluded is responsible for the low drag characteristic.

In contrast to these attempts to reduce skin friction by rather complex means, riblet surfaces are less susceptible to damage and they can be formed relatively straightforwardly, e.g. by machining or pressing or by the application of a preformed, e.g. extruded layer. It would clearly be preferable to employ such surfaces if they were able to give greater reductions of skin friction drag.

The mechanisms by which riblets influence the turbulent boundary layer over a wall surface is not yet fully understood and it is perhaps significant that different researchers have published conflicting data about the variation of net reduction of skin friction with rib length. If it can be postulated that they bring a turbulent near-wall flow closer to laminar flow conditions, their efficiency is only a fraction of what it might ideally be, bearing in mind that in equivalent turbulent and laminar flow regions the skin friction drag with laminar flow would be 80% less than that with turbulent flow. If a more significant proportion of this potential improvement could be achieved, whether by riblets alone, or by the use of riblets in combination with other means, the use of riblet surfaces could be considerably enhanced.

SUMMARY OF THE INVENTION

According to a first aspect of the present invention, there is provided an aerodynamic or hydrodynamic wall surface which is provided with a series of elongate projections extending in the direction of fluid flow relative to the surface to modify the interaction of a boundary layer of said flow with said surface, said projections comprising spaced larger height projections between each successive pair of which are a plurality of smaller height projections, the smaller height projections being sized in height and in projection-to-projection spacing to inhibit turbulent eddy motions in the boundary layer from penetrating deep between adjacent projections, the larger height projections being sized in height and in projection-to-projection spacing to constrain spanwise distribution of streaks in the boundary layer.

The dimensions for the profiles and distribution of the projections can be specified in known manner in wall units, a wall unit being a dimensionless value comprising an actual length value multiplied by a scalar quantity expressing the variation of wall shear stress with fluid density and viscosity. The heights of both the larger and the smaller projections are measured from the basic wall surface from which they project, and preferably the larger height projections have an effective height of at least eight wall units above the smaller projections.

In a first embodiment of this aspect of the invention, the larger height projections are spaced apart by an amount substantially greater than the mean spacing between the centres of adjacent streaks, with the aim of increasing the spanwise spacing of the streaks compared to their natural spacing and thereby reducing drag. For this purpose, the larger height projections should be spaced apart by an amount substantially greater than 80 wall units, preferably in the range of about 120 to 200 units, but no more that about 240 wall units.

In a second embodiment, the larger height projections are spaced apart by an amount of the order of the mean diameter of the streaks, with the aim of reducing both spanwise meandering of the streaks and direct impingement of the streaks on the smaller height riblets, thereby further reducing drag. For this purpose, the larger height projections should be spaced apart by between 25 and 50 wall units, preferably in the range of about 30 to 45 units.

The influence of the two types of larger riblets of these different functions can be additive in that the wall surface can be given larger height projections for both purposes. It is also possible to provide multiple groups of ribs that extend the result for either purpose, e.g., giving a plurality of successive increases of streak spacing.

The smaller height projections of these configurations can be equated with the uniform arrays of riblets of some of the researchers referred to above, in that these projections function to inhibit turbulent eddy motions in the boundary layer from penetrating to all parts of the surface, in particular deep into the grooves defined by adjacent riblets. Their effect is to displace the turbulent motion away from the wall. Depending upon their profile, they may also have some effect in inhibiting the spanwise gradients associated with the formation of the longitudinal vortices or "streaks" in the boundary layer and initiating secondary, smaller-scale longitudinal eddies which take energy from the larger scale streaks. Such riblets have hitherto only shown rather limited results (i.e. the 7% drag reduction referred to above). This is because they have functioned wholly or primarily in a passive manner with little influence on the evolution of the eddies themselves. In that case they are largely unable to directly moderate the mixing and momentum transfer that the eddies encourage and that is the major factor in the increase of boundary layer drag of turbulent flow in comparison with laminar flow.

If, however, the larger height projections are provided as, preferably individual, riblets set at appropriate intervals between series of smaller height riblets, the longitudinal vortices or streaks, which otherwise shift in a random manner transversely across the surface, may not only be constrained laterally, but may be moved further apart than their natural spacing. By increasing the disparity between the spanwise scale of the streaks and that of the smaller riblets, the larger riblets can promote a more rapid energy transfer from the streaks to the smaller-scale secondary vortices that these smaller riblets induce. They can then produce effects that permeate to the region above the smaller riblets and so improve the effectiveness of these riblets by reducing eddy activity there. In this sense both the larger and smaller riblets are able to function in an active manner.

According to a second aspect of the present invention, there is provided a fluid dynamic wall surface which is provided with a series of elongate projections extending in the direction of fluid flow relative to the surface for controlling interaction of boundary-layer turbulence with said surface to reduce skin friction, said projections being disposed in a repeated spanwise pattern in which the adjacent projections in each pattern repeat project to different heights.

In the simplest example of this aspect of the invention, the repeated pattern of projections consists of alternating higher and lower projections and the pattern repeat spacing between the higher projections is not greater and preferably less than the approximate diameter of the streaks in the boundary layer so that the streaks are free to meander spanwise of the surface while losing energy to smaller scale vorticity in the region of the peaks of the higher projections. Preferably, the spacing between the higher projections is less than 45 wall units. It is possible, however, to form a pattern of projections having three, or even more than three, different heights that will provide advantages over the known uniform height riblet surfaces, such patterns being preferably symmetrical. Again, the pattern repeat spacing between the highest of the three or more heights of projections is preferably no greater and advantageously less than the approximate diameter of the streaks.

Considering the simplest example of this aspect of the invention, i.e. the alternating higher and lower projections, the lower projections function to inhibit turbulent eddy motions in the boundary layer from penetrating to all parts of the wall surface, in particular deep into their grooves, resulting in displacement of the turbulent motion away from the wall and the consequent establishment of a virtual surface some ¾ of the height of the lower projections above the basic wall surface. The alternating higher projections can be so scaled in relation to the lower projections and the boundary layer thickness that they have the function of extending this effect. Because of their greater scale the action of the higher projections can be complementary to that of the lower projections and can keep the turbulent eddy motions further from the wall surface.

If the pattern consists of projections of three different heights, this effect is taken a stage further, but the additional improvement given by the third set of projections would be less than the improvement already given by a pattern of projections of two different heights, due to the increase in wetted area. The use of a repeat pattern with projections of substantially more than three different heights will not therefore in general give sufficient further improvement to justify its complexity.

The passive manner in which riblets of the kind already known function has already been mentioned and it appears to be the case that they do not have any significant influence on the evolution of the eddies themselves. This may also be true of the wall surface configurations of the present invention with different height riblets, but a greater reduction of skin friction can still be obtained because, in addition to providing their own contribution, the lower riblets modify the deep boundary layer region so that the higher riblets can be similarly operative at a greater distance from the wall surface.

Depending upon their profile, the riblets may also have some effect in inhibiting the spanwise gradients associated with the formation of longitudinal vortices or "streaks" in the boundary layer and initiating secondary, smaller-scale longitudinal eddies. However, in view of the relatively small drag reductions obtained in the published investigations of riblet surfaces, this would not seem be be a major effect, and the improvement offered by the differing heights of the adjacent projections of the pattern does not rely on them having such an influence.

Thus, it is possible to exert more control over streak formation and distribution by producing a pattern having projections of three (or more) different heights and the pattern repeat spacing between the highest projections is greater than the streak diameters, the highest projections being sufficiently higher than the next highest projections to constrain meandering of the streaks spanwise of the surface. Preferably, the pattern repeat spacing between the highest projections lies in the range 50 to 100 wall units if intended to anchor the streaks, but is in the range 120–240 wall units if they are intended to increase steak spacing also.

A factor in the relatively low efficiency of the earlier known riblet surfaces may be that their performance tends to be self-limiting. The way they displace turbulent eddy motions away from the wall surface tends to reduce the wall shear stress, which has a scaling influence reducing their effective height, and therefore curbing their efficiency. The presence of higher projections in the wall surface of this aspect of the invention reinforces the action of the lower projections and so forces the turbulent eddy motions further from the wall surface. At the same time this automatically compensates for any loss of efficiency of the smaller projections.

Another secondary benefit is also obtainable because there is some degree of progressive reduction of wall shear stress with the stream development length (i.e. the streamwise distance along the wall surface) that may be significant in the later part of the transition region and the early part of the turbulent boundary layer. The smaller projections of a suitable height for an early region of the turbulent boundary layer will therefore progressively show less effect along their length, but the higher projections now present extend the effective area of the flow modifying pattern over a greater stream development length.

According to a further aspect of the present invention, there is provided a fluid dynamic wall surface which is provided with a series of elongate projections extending in the direction of fluid flow relative to the surface to modify the interaction of a boundary layer of said flow with said surface, said projections having heights which, when expressed in wall units, change with distance along the wall surface in the direction of fluid flow.

As in the preceding aspects of the invention, the projections preferably form a substantially continuous spanwise array. An increase in the aspect ratio of the projections' transverse cross-section with distance along the wall surface can be utilised to give the increased height. Alternatively, there can be manufacturing advantages in providing increasing height projections whose transverse cross-sections taper from a base width to a peak, with an aspect ratio that is maintained essentially constant with change of height. Such a pattern at the upstream end will have large spaces between the projections, which may be simply flat-bottomed valleys, these spaces progressively narrowing as the projections grow in the direction of fluid flow.

As stated earlier herein, in turbulent flow conditions the projections function to inhibit turbulent motions in the boundary layer from penetrating to all parts of the wall surface, in particular deep into the grooves, resulting in a displacement of the turbulent motion away from the wall. The progressive increase of the height of the projections can extend those effects without disrupting the flow pattern. A secondary benefit arises because the self-limiting tendency of the flow, due to the fact that a virtual wall position is created at a substantial part of the initial height of the projections, is opposed by the increase of the projection height. The increase of projection height can therefore counter the degradation of their performance that would otherwise result from that tendency.

This benefit can be enhanced with varying height projections because the progressive reduction of wall shear stress with streamwise development length already referred to can be countered by the increase of height of the projections. This can result in the height increase more than compensating for the degradation of performance that the change of virtual wall position would produce on fixed height projections.

Where projections are provided with a varying height along their length, it is preferable to have a continuous change in height, the projections then appearing as "ramplets". A simpler arrangement, although possibly less efficient, would be to provide succeeding bands of projections, each band of different height from the two adjacent ones, so that the projections of each band have a uniform height. The bands are assembled together to present to the stream a series of projections with progressive step changes in height. The successive bands of projections may also be given different projection-to-projection pitches.

The use of riblet surfaces is not necessarily restricted to turbulent boundary layer flows. The literature is almost exclusively concerned with turbulent flow regimes, but it has recently been shown, by both experiments and numerical computations that the basic riblets can reduce drag by up to about 2.5% even in laminar flow, due solely to their influence on the viscous flow very near the wall (J Liandrat, E Coustols, L Djenidi, F Anselmet, X de Saint-Victor, F Fioc & L Fulachier: "Effects of Riblets on either fully developed Boundary Layers or Internal flows in Laminar Regime", in "Turbulence Control by Passive Means", Ed. E Coustols, Klumen Academic Publishers 1990).

Thus, according to a further aspect of the invention, a fluid dynamic wall surface is provided with projections in accordance with any of the previously discussed aspects and embodiments of the invention, the wall surface having an upstream portion on which a laminar boundary layer is established at predetermined conditions of fluid flow thereover, and a downstream portion on which a transition boundary layer is established at said predetermined conditions, the projections being positioned between and overlapping said upstream and downstream portions of the wall surface such that under said predetermined fluid flow conditions said upstream region of laminar boundary layer flow is extended downstream by interaction of said projections with the laminar boundary layer, thereby to delay the onset of the transition boundary layer.

Particularly when there is turbulent flow, in a preferred configuration according to the present invention, the projections, or at least the larger height projections where there are projections of different heights, have side faces that are inclined at an angle that varies over the height of the projections, each said side face having an intermediate region at a lesser steepness than the adjacent regions above and below said region and forming the lower part of a concave profile peak of the associated projection.

For best effect the transition to the concave-sided peaks should be positioned at or close to the virtual wall height established by the projections. The region below the transition preferably has substantially planar faces so as to form a series of steep-sided V-grooves between the projections in their lowest reaches. These can act in the manner already described to displace the turbulent motion away from the wall surface. The longitudinal vortices displaced above the virtual wall surface are then controlled by the concave peaks projecting into this region which, by virtue of their different profile, can act more strongly on the vortices.

When a pattern of different height projections is employed, if the enhanced displacement of the virtual wall surface resulting from the combination of projection heights puts that virtual surface above the height of the smallest projections, no benefit is achieved by modifying their side faces. To the extent that any of the smaller projections extends above the virtual wall position, it is an advantage that their side faces be given a similarly varied inclination, with the transition substantially at the height of the virtual wall position. This may result in a change of inclination occurring at a particular height above the actual wall surface that is the origin of the projections, but in particular cases the pattern of projections may produce a virtual wall surface height that varies spanwise with the projection pattern, and the positions of the changes of inclination on the individual projections can then follow those changes of height.

The transition to the concave profile may be substantially sharp-edged, but it is also possible to have a radiused or chamfered transition. The concave faces are preferably continuously curved to a relatively sharp-edged tip but it is also possible to build them up from a group of straight and/or curved sections and for convenience the tip itself may be flattened or radiused.

By way of example, reference will now be made to the accompanying schematic drawings.

BRIEF DESCRIPTION OF THE DRAWINGS

FIGS. 14 to 16c illustrate a number of modifications that can be applied individually or in combination to the configuration in FIG. 13, and FIGS. 17 to 22 illustrate some combined versions of the wall surfaces described with reference to the preceding figures.

DESCRIPTION OF THE PREFERRED EMBODIMENTS

Figure 1:
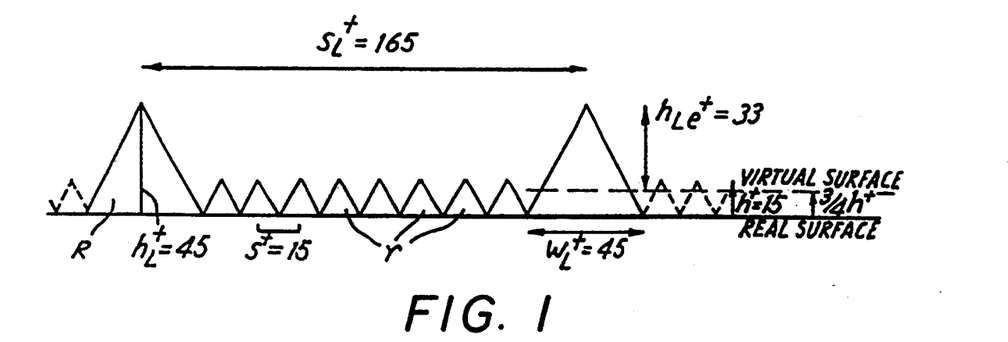
FIG. 1 illustrates a transverse cross-section through a form of wall surface having two different heights of projection in accordance with the invention, the section being perpendicular to the flow direction over the surface.

In FIG. 1, the wall surface is continuously ribbed in a regular pattern spanwise which consists of parallel groups of 8 uniform, smaller riblets r between individual larger riblets R, the riblets running in the stream direction over the surface in the turbulent boundary layer region, and preferably starting from the transition region of the flow over the surface. The pattern extending streamwise preferably continues over all the turbulent boundary layer area of the surface. The riblets are all shown with triangular profiles, but other profiles can be used, another preferred profile having a sharp-peaked form (peak apex included angle preferably not greater than about 20°) with concave valleys between successive peaks, as is illustrated with the riblets R', r' in FIG. 2. Furthermore, while FIG. 1 shows the riblets with base widths equal to their heights it may be preferred to increase the base widths to about twice the heights of the respective riblets; this is particularly relevant to cusp-shaped profiles shown in FIG. 2.

The preferred sizes and dimensional relationships of the riblets may be expressed in the non-dimensional form of so-called "law of the wall" of the variables, in which actual distance values are multiplied by a "wall unit" scalar quantity defined as:

$$\frac{\sqrt{(t/p)}}{v}$$

where
t is the wall shear stress,
p is the fluid density, and
v is the fluid kinematic viscosity.

In the example, the smaller riblets r have a non-dimensionalised height $h^+$ of 15 units and are set at a pitch $s^+$ also of 15 units. The larger riblets R are three times this size, with height $h_L^+$ and width $w_L^+$ at 45 units, giving a pitch $s_L^+$ of 156 units.

Because of the presence of the smaller riblets r, a virtual surface is established for the turbulent boundary layer flow some three-quarters of their height above the wall surface itself. The effective height ($h_{Le}^+$) of the larger riblets R, i.e. their height above the virtual surface produced by the riblets r, is therefore approximately 33 units. The larger riblets act in the region above the virtual surface to control the long regions of streamwise vorticity or streaks that form in the boundary layer by inhibiting their random spanwise movements, increasing their natural spanwise spacing, and encouraging the transfer of energy from the streaks to the smaller scale secondary vortices induced by the smaller riblets. In this flow mechanism, the actions of two forms of riblet reinforce each other in that the larger riblets influence the boundary layer to produce flow patterns which are associated with inherent reductions in drag and at the same time are more suited to manipulation by the smaller riblets, while the latter make their own contribution to the reduction of skin friction by moving the turbulent boundary layer for some way up their height. It is also possible that the presence of the smaller riblets, by changing the virtual wall position, so reduces the wall shear stress that the streaks are weakened and are therefore more amenable to control.

To amplify the above comment concerning the control which the taller riblets in FIG. 1 exert over the natural spanwise spacing of the streaks, it is pointed out that for speeds of up to about Mach 0.7, the streaks are typically of the order of 40 wall units in cross-section, with about 80 wall units between adjacent vortex cores. Hence, to move the streaks further apart than normal, the pitch $s_L^+$ of the tall riblets should be greater than 80 wall units. For optimum results a pitch $s_L^+$ in the range 120 to 200 wall units is preferred, but it is not thought that pitches of greater than about 240 wall units are desirable. Note that, assuming the riblet dimensions shown in FIG. 1, the above-detailed pitch relationship of the tall riblets to the streaks means that there should be at least four small riblets between each pair of tall riblets, preferably five to ten, and perhaps as many as thirteen.

Figure 3:
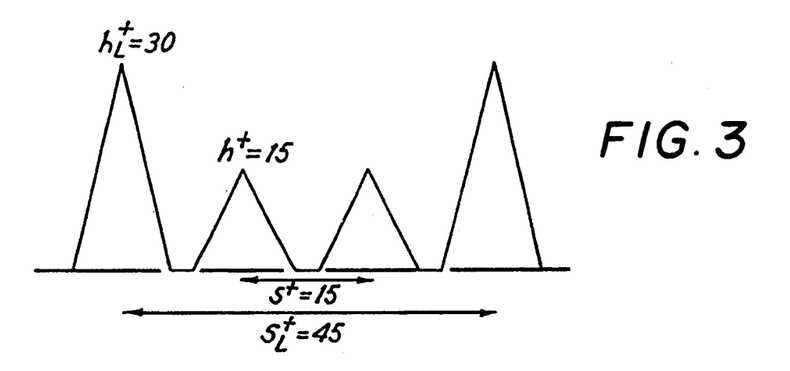

FIG. 3 illustrates another riblet pattern which has only a pair of smaller riblets r between successive larger riblets R, and in which successive riblets are separated by flat valleys. In the particular example of FIG. 3, the smaller riblets have $h^+$ and $s^+$ each of 15 wall units. The larger riblets have a height $h_L^+$ of 30 units, a base width of 15 units, and their pitch $s_L^+$, which is of course the pattern repeat, is 45 units.

Remembering that the meandering streak diameters are about 40 wall units, arrangements like FIG. 3, where the pitch $s_L^+$ of the tall riblets is of the order of the streak diameter, say 25 to 50 wall units, are aimed primarily at constraining the streaks' spanwise meandering while at the same time ensuring that they cannot impinge on the smaller riblets to any substantial extent because there is not enough space between the flanks of the taller riblets to allow them to drop down onto the smaller ones. Based on test results in air flow at Mach No. 0.5, a pitch $s_L^+$ in the range 30 to 45 wall units is to be preferred. Assuming the riblet dimensions shown in FIG. 3, it will be understood that prevention of contact between the streaks and the smaller height riblets means that there should be no more than three small riblets between each pair of tall riblets, preferably only two.

Figure 2:
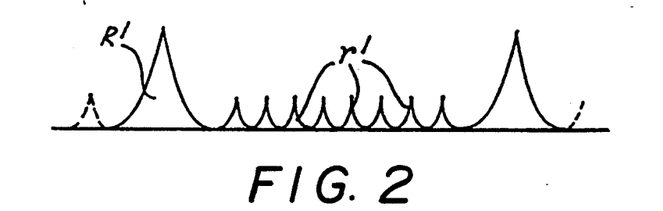
FIGS. 2 to 5 illustrate a number of modifications that can be applied individually or in any combination to the configuration of FIG. 1.
Figure 4:
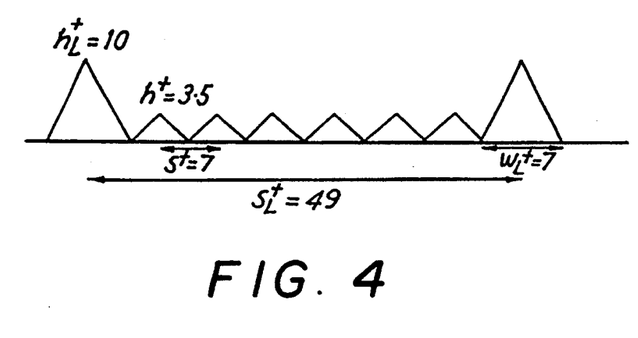

It may be preferred, especially when using rounded or flat-bottomed valley configurations as in FIGS. 2 and 3, to reduce the heights of the smaller riblets in relation to their pitch. FIG. 4 illustrates an example with six smaller riblets r between successive larger riblets R, with $h^+ = \frac{1}{2}s^+ = 3.5$ wall units, $h_L^+ = 10$ units and $s_L^+ = 49$ units. Due to the magnitude of the pitch $s_L^+$, FIG. 4 may be regarded as a variation of the FIG. 3 embodiment of the invention, rather than of FIG. 1.

Many other variations of the sizes and profiles of the riblets are possible within the scope of the invention. The ratio h:s is preferably not substantially less than 1:2 nor substantially greater than 2:1 as regards the smaller riblets, although higher aspect ratios h:w can be more easily tolerated for the large riblets to the extent of giving them a blade-like profile. As far as concerns sizes, the following are the preferred size ranges for turbulent flow in non-dimensional wall units for flow speeds up to the transonic regime and perhaps even beyond: for the smaller riblets r, $2 \leq h^+ \leq 20$, and preferably $5 \leq h^+ \leq 15$ $6 \leq s^+ \leq 40$, and preferably $10 \leq s^+ \leq 20$ for the larger riblets R, overall ranges would be $8 \leq h_{Le}^+ \leq 45$, and preferably $12 \leq h_{Le}^+ \leq 35$ $25 \leq s_L^+ \leq 240$ and preferably $30 \leq s_L^+ \leq 200$ If the aim is to use the large riblets R to move the streaks further apart than their natural spacing, as for FIG. 1, then preferred ranges would be $12 \leq h_{Le}^+ \leq 35$ and $120 \leq s_L^+ \leq 200$.

If the aim is to use the large riblets R to constrain meandering of the streaks, as for FIG. 3, then preferred ranges would be $12 \leq h_{Le}^+ \leq 20$ and $30 \leq s_L^+ \leq 45$.

In general, the base width $w_L^+$ of the larger riblets R will be kept to less than 60 wall units. Variations within the ranges specified may be made independently for each parameter but the larger riblets must of course project above the smaller riblets and a minimum projection of five wall units above the virtual surface is desirable to enable streak control. Furthermore, the relationship of $s^+$ to $s_L^+$ must always allow at least two smaller riblets to be interposed between successive larger riblets.

Figure 5:
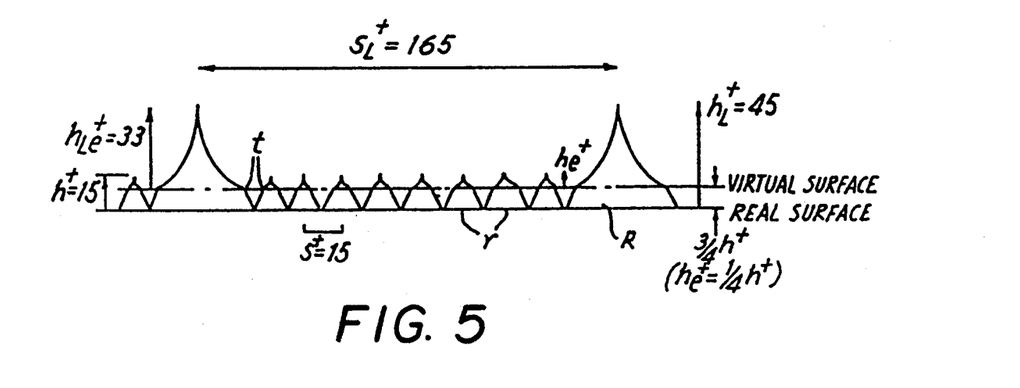

FIG. 5 illustrates another wall surface riblet pattern within the scope of the invention with modified riblet profiles. Like the example in FIG. 1, the smaller riblets r of this illustrative example have a non-dimensionalised height $h^+$ of 15 units above the wall surface and are set at a pitch $s^+$ also of 15 units. The larger riblets R have a height $h_L^+$ and width $w_L^+$ of 45 units, so that their pitch $s_L^+$ is 165 units.

The smaller riblets r establish a virtual surface for the turbulent boundary layer flow some 0.75 $h^+$ above the wall surface itself and below that level all the riblets have planar inclined side faces. At the level of the virtual surface there is a transition t to a smaller inclination and the riblets continue upwards from that point of inflection with concave side faces to a sharp-peaked tip, in analogy to the concave form of riblet illustrated in FIG. 2. Above the virtual wall surface, the larger riblets R have a height ($h_{Le}^+$) of 33 wall units, while the corresponding height ($h_e^+$) of the smaller riblets is 3 units.

The differently profiled regions are adapted to different functions. The regions below the virtual wall surface form the relatively deep V-grooves that are better able to inhibit penetration of turbulent eddy motions, while the concave faces above the virtual wall surface can more effectively promote very small scale longitudinal vortices which drain energy from the larger streaks in the turbulent boundary layer flow. To perform their functions effectively the concave faces should form relatively sharp-edges peaks.

It will be appreciated that the effects described can be achieved, at least in substance, with modified forms of the inclined side faces shown. In particular, it may be desirable for practical reasons to blunt the points of inflection or the peaks of the riblet faces; also, these faces may comprise straight and/or curved portions both below and above the virtual wall surface without unduly changing the general character of the profiles required for the functions described.

The number of smaller riblets between successive larger riblets can be greater or smaller than the group of 8 shown and the profiles of both series of riblets may be varied. If the larger riblets serve only to locate the streaks in position, their peaks may be flattened or rounded to reduce their inherent drag without affecting their function. If, however, they are employed to reduce the strength of the streaks, the top peaks will be retained and may be further emphasised by other changes of form. Similarly, the profile of the smaller riblets can be varied in accordance with their function.

Figure 6:
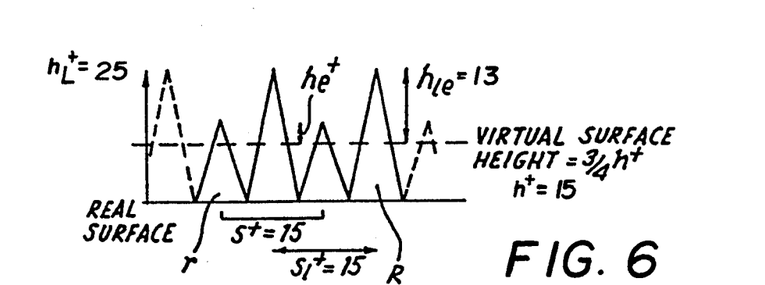
FIG. 6 illustrates in schematic form a transverse cross-section through another wall surface formed with two different heights of projection in accordance with the invention, the section again being perpendicular to the flow direction over the surface.

Referring now to FIG. 6, the wall surface is shown with alternating higher riblets R and lower riblets r, this pattern being repeated spanwise and the riblets running in the stream direction over the surface in the turbulent boundary layer region, and preferably starting from the transition region of the flow over the surface. The pattern extending streamwise preferably continues over all the turbulent boundary layer area of the surface. It is not essential that the riblets be aligned precisely with the fluid stream and deviations of up to 10°–15° can be tolerated. The riblets are all shown with triangular profiles, but other profiles can be used, another preferred profile having a sharp-peaked from (apex included angle preferably not greater than about 20°) with concave valleys between successive peaks, as is illustrated with the riblets R', r' in FIG. 7. Triangular riblets separated by narrow flat valleys can also be used. Furthermore, while FIG. 6 shows both the large and small riblets with the same base widths to give relatively sharp isosceles triangular profiles, it may be preferred to increase the base widths to about twice the heights of the respective riblets; this is particular relevant to cusp-shaped profiles shown in FIG. 7.

Figure 7:
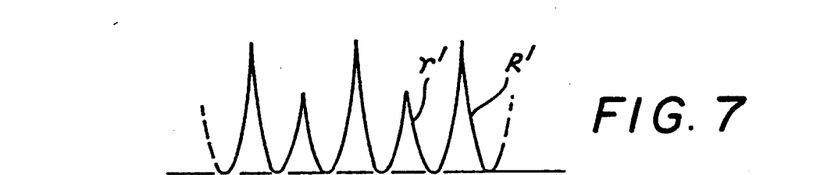
FIGS. 7 to 12 illustrate a number of modifications that can be applied individually or in combination to the configuration in FIG. 6.

In the example of FIGS. 6 and 7, the smaller riblets r have a non-dimensionalised height $h^+$ of 15 wall units and larger riblets R have a height $h_l^+$ of 25 wall units. The width $w^+$ of each of the riblets is 7.5 wall units giving a pitch $s_l^+$ of 15 wall units for the pattern repeat.

Because of the presence of the smaller riblets r, a virtual surface is established for the turbulent boundary layer flow above the wall surface itself. The influence of the riblets r may be sufficient to set this virtual surface some three-quarters of their height above the wall surface, so that the effective height ($h_{le}^+$) of the larger riblets R, i.e. their height above the virtual surface, is therefore approximately 13 units, but the larger riblets add their own influence in the region above this so that the virtual surface is displaced further out.

As in the first examples, the ratio h:s is preferably not substantially less than 1:2 nor substantially grater than 2:1. Within this range the aspect ratio (height:base width) can be higher, especially for the large riblets. The following are the preferred size ranges in non-dimensional wall units for low speed flow: for the smaller riblets r, $$2 \leq h^+ \leq 20; \text{ preferably } 15 \leq h^+ \leq 15$$

for the larger riblets R, $$8 \leq h_{le}^+ \leq 45; \text{ preferably } 15 \leq h_{le}^+ \leq 35$$

for the pattern repeat pitch, $$6 \leq s_1^+ \leq 50; \text{ preferably } 20 \leq s_1^+ \leq 40.$$

Variations within the ranges specified may be made independently for each parameter but of course the larger riblets must project above the smaller riblets and a minimum projection of 3 wall units is required for their effects to be noticeable.

If a more extended pattern of riblets is used, the pattern repeat pitch will be increased while maintaining substantially the same base widths for the individual riblets. With riblets of three different heights, i.e. riblets $r_i$ of an intermediate height being interposed between higher and lower riblets in the manner illustrated in FIG. 8, the pattern repeat pitch is doubled. This is also the case for the example shown in FIG. 9, where the heights of the riblets decrease to a minimum in a region centrally positioned between the higher riblets. The profiles of the different height riblets may be different.

Figure 10:
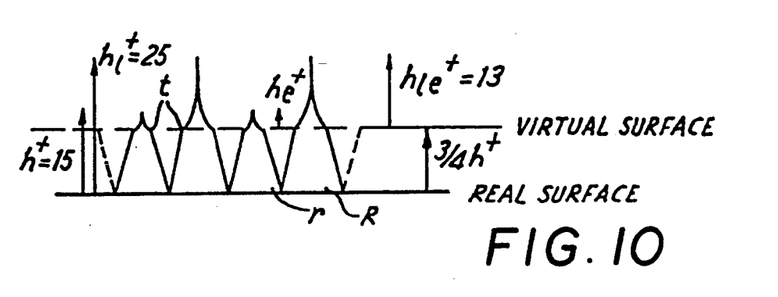

FIGS. 10 to 12 illustrate further wall surface riblet patterns having modified riblet profiles. In FIG. 10, with its pattern of alternating riblets of two different heights, the smaller riblets re-establish a virtual wall surface at 0.75 of their height. The pattern pitch is 15 wall units, which is therefore the pitch ($s^+$, $s_L^+$) of both the smaller and larger riblets. The height of the smaller riblets is 15 wall units and that of the higher riblets R is 25 wall units; above the virtual wall surface they have a height ($h_{le}^+$) 13 units for the larger riblets and ($h_e^+$) 3 units for the smaller riblets. From the point of transition t the side faces of the riblets extend upwards with the sharp-peaked concave profiles already described while below the virtual wall surface they form deep-sided V-grooves.

Figure 11:
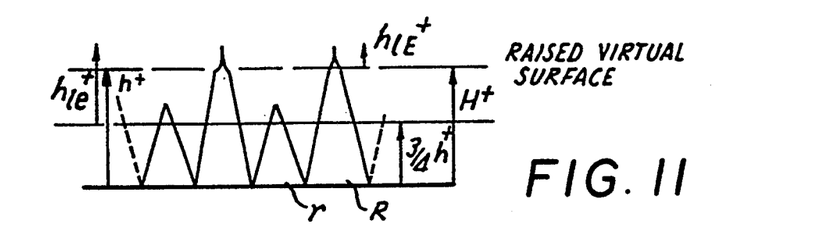

Whereas the smaller riblets by themselves would not be able to establish a virtual surface above the wall surface by more than about three-quarters of their height, the higher riblets can be so scaled in relation to the smaller riblets that they have the function of extending this effect to its limit. If the presence of the larger riblets has the effect of taking the virtual wall surface higher the smaller riblets may lie entirely below the virtual surface. FIG. 11 illustrates a modification of the example in FIG. 10 in which this occurs and it shows that in addition to the 0.75 $h^+$ displacement of the wall surface produced by the smaller riblets, the larger riblets may induce a further displacement in the region of 0.75 $h_{le}^+$ so that the virtual wall surface is at a height of approximately (0.75 $h^+$ + 0.75 $h_{le}^+$). The height of the smaller riblets being less than this they therefore have a completely planar profile, while side faces of the larger riblets are given their concave form over their effective height ($h_{1E}{}^+$) from the raised virtual wall surface.

Figure 12:
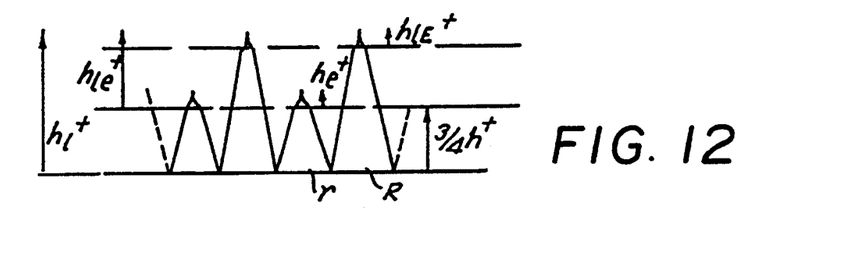

It may be found, however, that a riblet pattern in which the height changes between successive riblets produces a similarly undulating virtual wall surface, especially if the pattern consists of more than two riblets. This can be accommodated by a configuration such as is shown in FIG. 12. Here it is assumed that the virtual wall surface height for the smaller riblets r corresponds to that in the example of FIG. 10, whereas for the larger riblets R it corresponds to that in FIG. 11. The point of inflection of the smaller riblets, i.e. their intersection with the virtual surface, is at 0.75 $h^+$ above the real surface, i.e. the base line of the pattern of riblets, and for the larger riblets the point of inflection is at approximately ($0.75 h^+ + 0.75 h_{le}{}^+$) above the real surface. The portion of the smaller riblets having a concave profile thus extends over a height $0.25 h^+$ while the concave profile of the larger riblets extends over a height approximately $0.25(h_1{}^+ - 0.75 h^+)$.

In the riblet patterns of FIGS. 10 to 12, to perform their functions effectively the concave faces should form relatively sharp-edged peaks.

It will be appreciated that the effects described can be achieved, at least in substance, with modified forms of the inclined side faces shown. In particular, it may be desirable for practical reasons to blunt the points of inflection or the peaks of the riblet faces; also, these faces may comprise straight and/or curved portions both below and above the virtual wall surface without unduly changing the general character of the profiles required for the functions described. Furthermore, the peaks of the larger riblets may be flattened or rounded to reduce their inherent drag without affecting their displacement function. As another possibility, for increasing the spanwise spacing of the streaks, as described with reference to FIG. 1, the larger riblets of that example can take a thin, generally rectangular section form.

Figure 8:
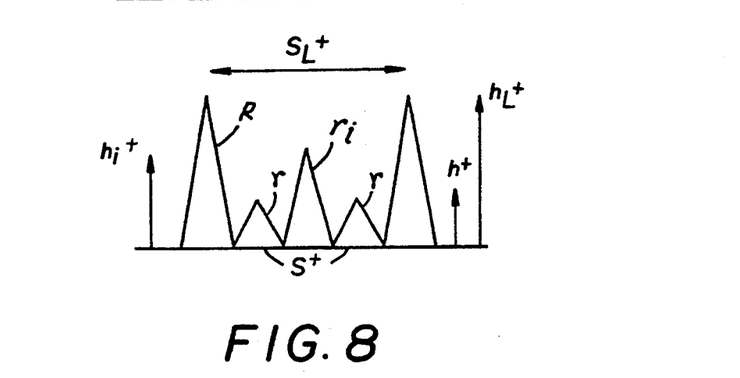

Returning now to a consideration of FIGS. 6 and 8, which illustrate embodiments of the invention of which FIGS. 7 and 10 to 12 are variations, it will be evident from what has already been said that both embodiments are aimed at adding the primarily drag-reducing influence of the larger riblets to that of the smaller ones, thus allowing a larger drag reduction to be obtained than if the larger or smaller ones were used alone. In the FIG. 6 arrangement the riblets are shown with dimensions $s^+$, $s_1{}^+$, $h^+$ and $h_{le}{}^+$ which all fall within the drag reduction regime for small basic riblets. However, arrangements like FIGS. 8 and 9 can be designed where $s_L{}^+$ is greater than the streak diameters (say, $50 \leq s_L{}^+ \leq 100$) and $h_L{}^+$ is sufficiently higher than $h_1{}^+$ to constrain the streaks, these arrangements being aimed at restraining meandering of the streaks spanwise of the pattern and perhaps even increasing their spacing somewhat. In this case the intermediate size riblets $r_i$ prevent the streaks from impinging on the small riblets r and may cause them to lose energy to smaller scale vorticity in the region of their peaks, particularly if the peaks are given a concave profile. With such dimensions, FIGS. 8 and 9 can be understood as embodying a combination of the principles of drag-reduction discussed in relation to FIGS. 3 and 6 respectively.

Figure 9:
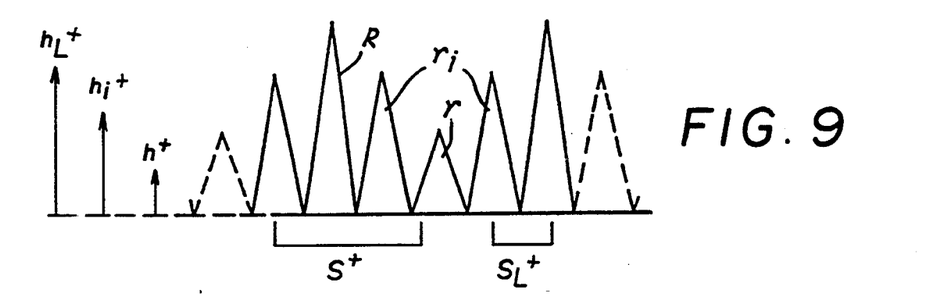

On the other hand, by reducing the value of $h_L{}^+$ below that necessary to constrain the streaks and/or reducing the value of $s_L{}^+$ in FIGS. 8 and 9 to about the streak diameter or less (say, $s_L{}^+ \leq 50$ wall units), so that the streaks are relatively free to meander over the peaks of the highest riblets R while still losing energy to smaller scale vorticity in the region of the peaks, there is produced a configuration which can be regarded simply as an extension of the FIG. 6 embodiment to patterns involving three different riblet heights rather than two, as previously explained.

Figure 13:
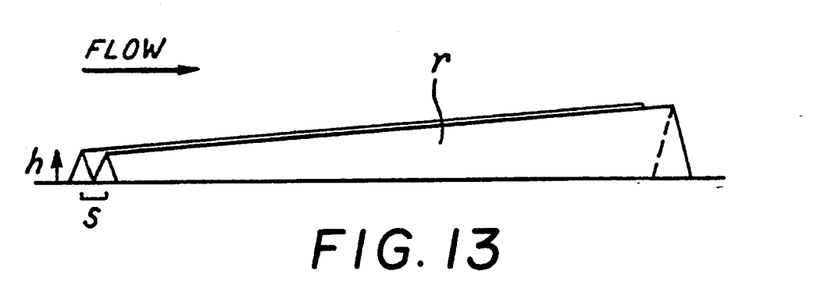
FIG. 13 illustrates a further riblet configuration of the invention comprising one pair of triangular cross section projections or riblets out of an array of such riblets on a wall surface.
Figure 14:
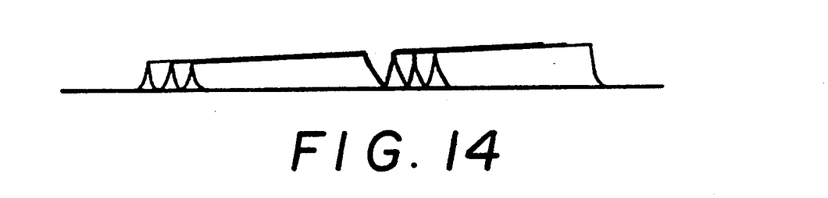

In FIG. 13 the wall surface has a continuous series of riblets r running in the streamwise direction over the surface, starting in the transition region, or at least from the onset of the turbulent boundary layer region, and preferably over the entire turbulent boundary layer area of the wall. The riblets have a constant base width in this example but their height increases continuously along their length to give them an increasingly sharper triangular profile. They can have other profiles, such as the sharp peaks (apex included angle preferably not greater than 20°) with rounded valleys shown in FIG. 14. Furthermore, while FIG. 13 shows the riblets with base widths equal to their heights at their upstream end it may be preferred to increase the base widths to as much as about three times the upstream end heights of the respective riblets; this is particularly, but not solely, relevant to cusp-shaped profiles as shown in FIG. 14.

Figure 15:
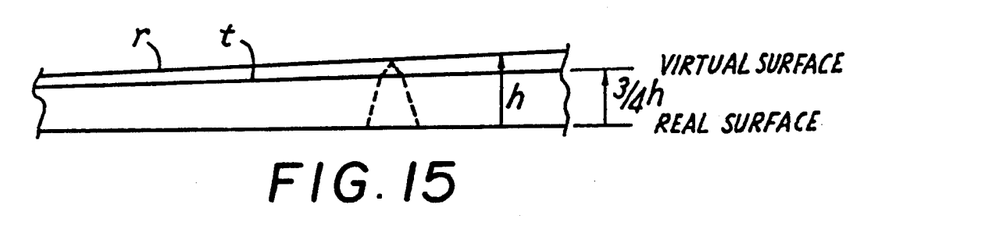

FIG. 15 illustrates another form of profile that can be employed for the riblets of the present invention. It is assumed that the riblets establish a virtual wall surface at about 0.75 h. Below that level there is a V-groove profile, whereas there is a change of slope at that level, from which the riblets extend with sharp-peaked concave profiles. As in preceding examples, differently profiled regions are adapted to different functions. The regions below the virtual wall surface form the relatively deep V-grooves that are better able to inhibit penetration of turbulent eddy motions, while the concave faces above the virtual wall surface can more effectively promote very small scale longitudinal vortices which drain energy from the larger streaks in the turbulent boundary layer flow. To perform their functions effectively the concave faces should form relatively sharp-edged peaks. Since $h^+$ is itself increased with distance along the direction of fluid flow, the point of transition of the profile also rises along the length of the riblet.

It will be appreciated that the effects described can be achieved, at least in substance, with modified forms of the inclined side faces shown. In particular, it may be desirable for practical reasons to blunt the points of inflection or the peaks of the riblet faces, while these faces may comprise straight and/or curved portions both below and above the virtual wall surface without unduly changing the general character of the profile required for the functions described.

Reference has already been made to the possible advantages of varying the height of the riblets streamwise and some embodiments will now be described. In the examples of FIGS. 13 to 15, the riblets r have a progressively increasing height. They have at their leading ends a non-dimensionalised height $h^+$ in the range: $2 \leq h^+ \leq 20$, preferably between 5 and 15 wall units, their base widths $w^+$ being the same so that their aspect ratio $h^+/w^+$ at their leading ends is 1. However, if $w^+$ remains constant as $h^+$ the increases towards their downstream ends, the aspect ratio of the riblets will evidently increase. Their spanwise pitch or distance $s^+$ between adjacent apices is in the range: $6 \leq s^+ \leq 40$, preferably between 10 and 30 wall units. Variations within the ranges specified may be made independently for either parameter.

In all cases, it may improve performance, if, at their leading edges, the riblets are faired into the wall surface to avoid drag increments associated with the flow meeting a bluff leading face. For reducing wetted area it may also be possible to have short spanwise-extending gaps as seen in FIG. 14 (less than the boundary layer thickness δ in the streamwise direction) between riblet areas (themselves greater than 2δ in streamwise length) without sacrificing the advantages offered by the riblets, although this may result in increased pressure drag. Furthermore, it is not essential that the riblets be aligned precisely with the fluid stream and a variety of experimental studies have shown that in turbulent flow deviations of up to at least 10°-15° can be tolerated. Because of the improved control of vortex structure another advantage of ramplets may be an increased tolerance to yaw, i.e. the maintenance of drag reduction at angles exceeding ±15°.

Figure 16A:
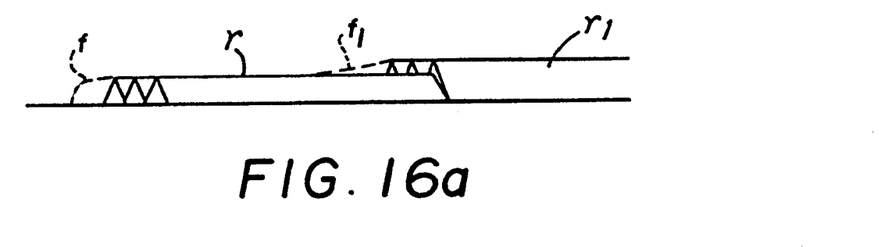
Figure 16B:
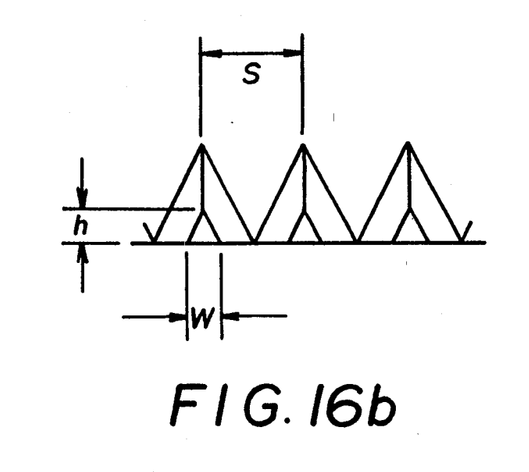
Figure 16C:
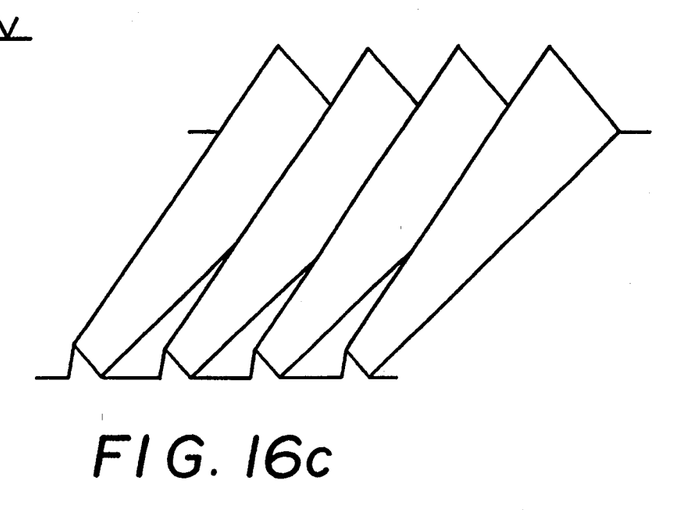

FIGS. 16a to 16c show two alternative designs which are intended to facilitate the manufacture of surfaces which have a streamwise increase of riblet height.

FIG. 16a is a low aspect perspective view showing increase of riblet height in a series of steps, as shown by the riblets $r_1$ succeeding the riblets $r$. Such uniform height riblets can be produced relatively easily by machining or extrusion, and if required at each step the leading edges of the riblets can be faired, as indicated by the dashed lines f and $f_1$. The pitch of the riblets can similarly be progressively increased at each stage, not necessarily simultaneously with an increase of height.

In the configuration of FIGS. 16b and c, which show end elevation and perspective views, the base width w increases with height h to maintain a constant aspect ratio h/w and constant pitch spacing s.

Figure 17:
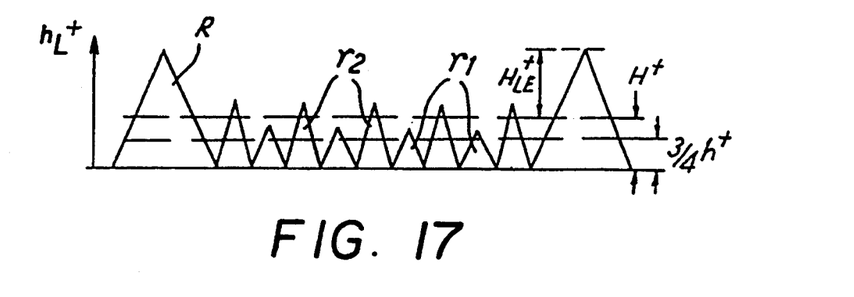

Further examples will now be described illustrating some of the possible combinations of the configurations already described. In the examples of FIG. 6, a reduction of the skin friction of a turbulent boundary layer is obtained by the use of a series of elongate riblets disposed to a repeated spanwise pattern in which the adjacent riblets in each pattern project to a different height. Such a configuration can be used in conjunction with the example presented in FIG. 1. In FIG. 17, groups of the smaller height riblets $r_1$, $r_2$ between successive larger riblets R are given different heights so as to operate more effectively on the inner boundary layer region between larger riblets and so gain a reduction in skin friction that is additional to that resulting from increased spacing of the streaks due to the presence of said larger riblets. This concept may also be realised in a riblet pattern in which there are groups of adjacent uniform height riblets between riblets of two different heights, e.g. in the example of FIG. 17, all the riblets $r_2$ except the central one in the pattern being replaced by smaller riblets $r_1$, this last arrangement having the advantage that wetted area is reduced. To retain their functional effect, the exclusion of any of the intermediate height riblets should be limited to the extent that it does not leave any group of the smallest ribs with a span of more than about 50 wall units.

The function of the groups of smaller riblets $r_1$, $r_2$ of different heights as is described in relation to FIG. 11, is to displace the virtual wall surface further than is possible with uniform height smaller riblets. The larger riblets R alternating with the groups of varying height smaller riblets are intended to exercise the streak control functions described above, e.g. in relation to FIG. 1. For that purpose they must extend significantly higher above the virtual wall surface than any of the smaller height riblets. In the example of FIG. 17 showing two heights of smaller V-groove riblets in alternation, the smaller riblets $r_l$ of height h+ establish a virtual wall position 0.75 h+ which is the datum for effective height of the larger riblets $r_2$. If the effective height of the riblets $r_2$ is here termed $h_{le}$+ in distinction from the effective height $h_{LE}$+ of the larger height riblets R, the new virtual wall position H+ is at a height in the region of 0.75 $h_1$+, that is to say, $$0.75(h_{le}{}^+ +0.75h^+) \leq H^+ \leq (0.75\ h_{le}{}^+ +0.75\ h^+)$$

As already mentioned, the effective height $h_{LE}$+ of the larger height riblets above the new virtual wall position should be at least 8 wall units greater, i.e. their height $h_L$+ from the original wall surface is $$\leq 8+(0.75\ h_{le}{}^+ +0.75\ h^+)$$

Figure 18:
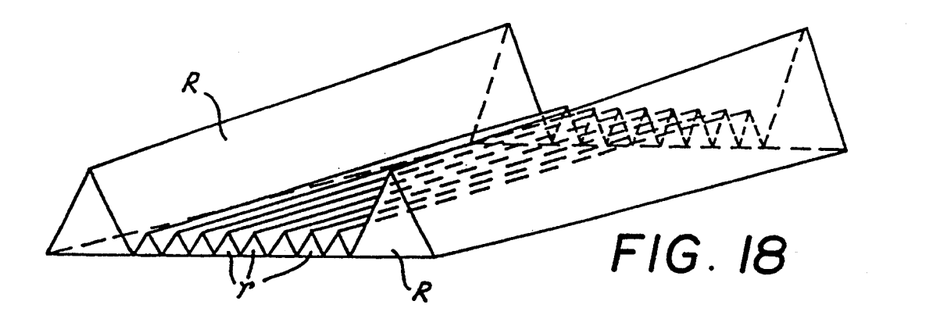

As a further example of the combination of features disclosed with reference to preceding figures, FIG. 18 illustrates the configuration of FIG. 1, with the riblets given progressively increasing heights with distance along the wall surface in the direction of fluid flow, as in the configuration of FIG. 13. This can be done with the configurations of riblets described above, whether they are composed of pluralities of uniformly smaller height riblets between successive larger riblets or whether the smaller riblets are themselves of different heights at any particular station in the direction of the stream.

Figure 19:
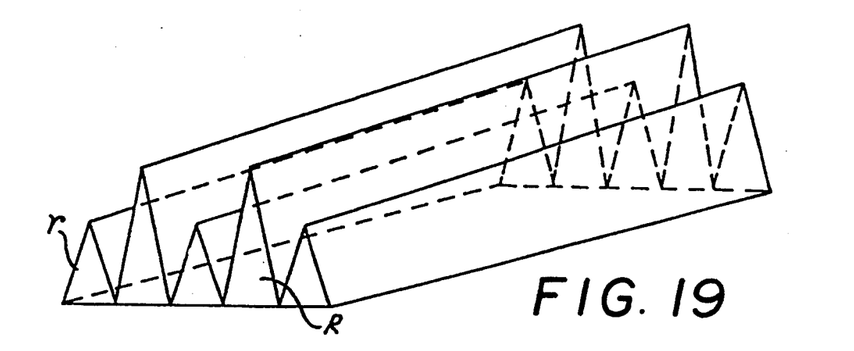
Figure 20:
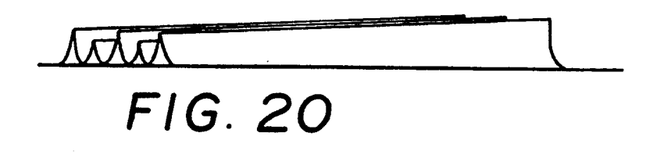
Figure 21:
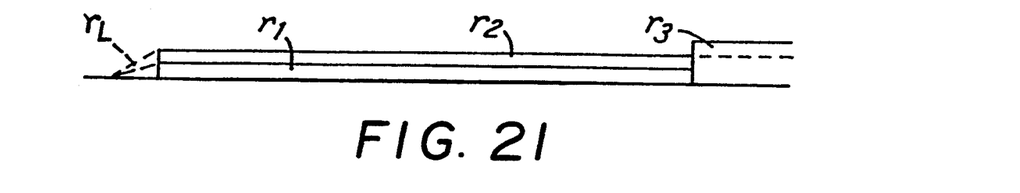

When applying streamwise increases of riblet height to patterns of different height riblets, the increase can be continuous, as shown in FIGS. 19 and 20, or stepped, as shown in FIG. 21. Since the self-limiting effect and progressive reduction of wall shear stress with development length that is countered by the height increase will first render the smallest riblets progressively inoperative, stepped height increases can be provided in a staggered manner. For example, FIG. 21 illustrates how, with a spanwise pattern of riblets $r_1$, $r_2$ of two different heights, the smaller riblets $r_1$ can be succeeded by a third series of riblets $r_3$ higher than the previously larger riblets $r_2$, and if a further stage is required the latter can be succeeded by a fourth still larger series, so that at each station in the direction of the stream the pattern is always composed of riblets of two different heights. FIG. 21 also indicates at $r_L$ how, at the leading edge of the riblet pattern, the riblets can be faired into the wall surface to avoid a drag increase due to the flow meeting a bluff leading face. When there is a progressive stepped increase of the height of the riblets, as described above, the leading edge of each step may be faired similarly, although this is not illustrated.

Figure 22:
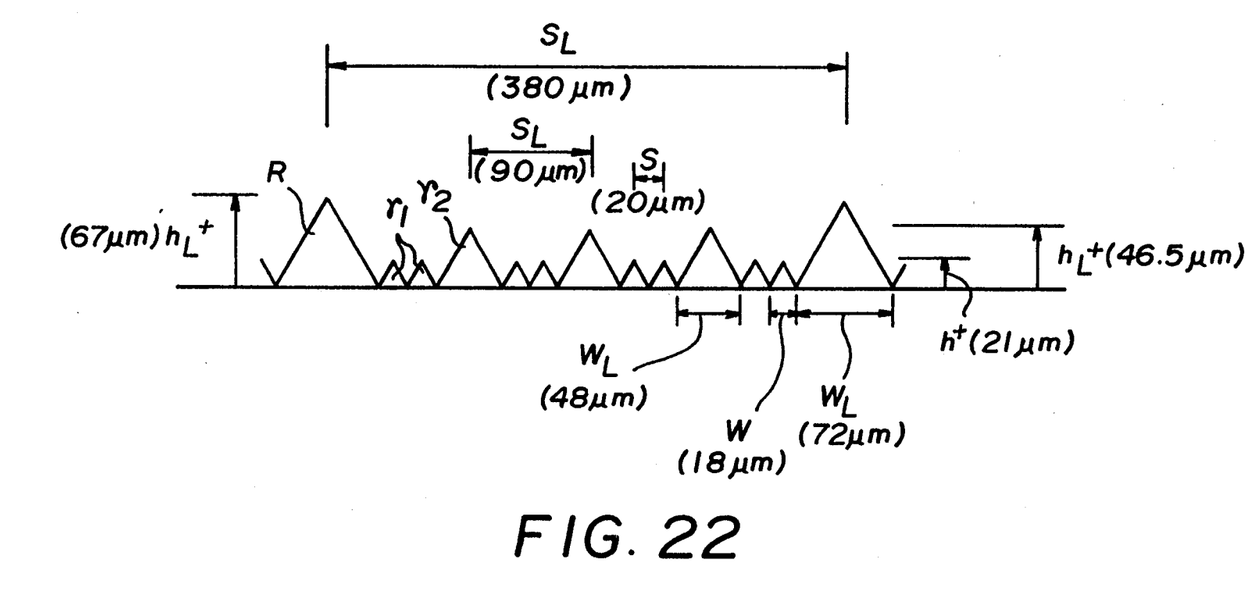

FIG. 22 shows an example of the riblet pattern of FIG. 3, with exemplary absolute dimensions included. The dimensions are chosen for main stream flow speeds of Mach 0.5.

It will be understood that the other features already disclosed can be incorporated in any combination of the different configurations.

In order to provide some assurance that the types of varied height riblet patterns proposed herein really would produce more drag reduction than prior uniform height patterns, a sample of adhesive-backed pvc film was embossed with the V-groove riblet pattern shown in FIG. 22, representing a combination of the ideas described with reference to FIGS. 1, 3 and 6, and was tested in a wind-tunnel at two widely different wind speeds, Mach No. 0.50 and Mach No. 0.88. The following Table lists the riblet dimensions.

| Riblet | Characteristic Dimension | Absolute Value in Micrometers | Value in Wall Units* Mach 0.50 | Value in Wall Units* Mach 0.88 |
|---|---|---|---|---|
| $r_1$ | h (height) | 21 | 11 → 9 | 14 → 12 |
|  | s (pitch) | 20 | 12 → 10 | 15 → 13 |
| $r_2$ | $h_l$ | 46.5 | 24 → 21 | 32 → 37 |
|  | $s_l$ | 90 | 45 → 39 | 60 → 50 |
| R | $h_L$ | 67 | 35 → 30 | 47 → 39 |
|  | $s_L$ | 380 | 187 → 160 | 254 → 210 |

*N.B. The range of wall units given for each characteristic dimension indicates the influence of increasing Reynolds Number streamwise of the riblets.

At Mach. 0.50 the riblet dimensions expressed in wall units fell within the size ranges previously quoted for the three basic types of patterns combined in the pattern of FIG. 22 and better drag reduction measurements were obtained for this pattern than for an array of uniform-sized riblets similar to riblets $r_1$; whereas 11% drag reduction relative to a plain surface was obtained for the pattern of FIG. 22, only 6% drag reduction was obtained for the $r_1$ riblets alone.

At Mach 0.88, however, the riblet dimensions were not at or near optimum and the drag reduction obtained was less than for the $r_1$ riblets alone.

The ranges of riblet dimensions in wall units referred to above appear appropriate for both low and high free-stream velocities over a range of Mach numbers of 0.1–1.0 and even beyond.

However, the factors that determine the optimum riblet dimensions are many and complex. The form of the underlying body, which may have streamwise and-/or spanwise curvatures or discontinuities, and the possibility of non-uniform free-stream velocity values over the extent of a riblet array introduce further influences and an empirical evaluation of the optimum riblet dimensions may be necessary.

The invention is generally applicable to the wall surfaces of bodies in which a reduction of skin friction is sought. It may thus provide a means of reducing drag on the external surfaces of vehicles, including aircraft, land vehicles and watercraft. It can also be used in machines, e.g. for the blading, both rotating and stationary, of turbomachines, and for the internal surfaces of pipes and conduits. It will be understood that the invention includes the possibility of forming the surface riblets integrally with the bodies concerned and also of providing surface elements, e.g. as sheets or tapes, having the riblets, for application to bodies to provide the required surface configurations thereon.

The description related to the drawings has referred mainly to the drag reduction effects that can be obtained using the invention, by means of momentum transport. This is only one of the potential benefits offered by the invention. Because of the influence on flows close to the wall surface, it is similarly possible to modify heat transfer rates between a wall surface and a flow over that surface. The patterns of riblets can also be used to modify the transfer of materials, as when it is required to release a coating material into a fluid flow at a controlled rate. It will be clear from the preceding description that if the material to be released is held deep between adjacent projections, it will pass into the fluid more slowly because the projections have moved the local high velocity areas, such as the streaks, further away from the wall surface.

We claim:

1. An aerodynamic or hydrodynamic wall surface provided with a series of elongate projections extending in the direction of fluid flow relative to the surface to modify the interaction of a boundary layer of said flow with said surface, said projections comprising spaced larger height projections between each successive pair of which are a plurality of smaller height projections, whereby in operational use the smaller height projections inhibit turbulent eddy motions in the boundary layer from penetrating deep between adjacent projections, and whereby in operational use the larger height projections constrain spanwise distribution of streaks in the boundary layer.

2. The wall surface of claim 1, in which the larger height projections have an effective height of at least eight wall units above the smaller projections, the heights of both the larger and the smaller projections being measured from the wall surface from which they project.

3. The wall surface of claim 1, in which the larger height projections are spaced apart by an amount substantially greater than the mean spacing between the centers of adjacent streaks in the boundary layer, so as to increase the spanwise spacing of the streaks compared to their natural spacing, thereby reducing drag.

4. The wall surface of claim 3, in which the larger height projections are spaced apart by an amount in the range of 80 wall units to 240 wall units.

5. The wall surface of claim 3, in which the larger height projections are spaced apart by an amount in the range of about 120 to 200 units.

6. The wall surface of claim 1, in which the larger height projections are spaced apart by an amount of the order of the mean diameter of the streaks, so as to reduce both spanwise meandering of the streaks and direct impingement of the streaks on the smaller height riblets, thereby reducing drag.

7. The wall surface of claim 6, in which the larger height projections are spaced apart by between 25 and 50 wall units.

8. The wall surface of claim 6, in which the larger height projections are spaced apart by between 30 and 45 wall units.

9. A fluid dynamic wall surface provided with a series of elongate projections extending in the direction of fluid flow relative to the surface for controlling interaction of boundary-layer turbulence with said surface to reduce skin friction, said projections being disposed in a repeated spanwise pattern in which the adjacent projections in each pattern project to different heights, whereby the lower projections function to inhibit turbulent eddy motions in the boundary layer from penetrating to all parts of the wall surface, resulting in displacement of the turbulent motion away from the wall and the consequent establishment of a virtual surface some ¾ of the height of the lower projections above the wall surface.

10. The wall surface of claim 9, in which the repeated pattern of projections consists of alternating higher and lower projections and the pattern repeat spacing between the higher projections is not greater than the approximate diameter of the streaks in the boundary layer, whereby the streaks are free to meander spanwise of the surface while losing energy to smaller scale vorticity in the region of the peaks of the higher projections.

11. The wall surface of claim 10, in which the spacing between the higher projections is less than 45 wall units.

12. The wall surface of claim 9, in which the pattern of projections has at least three different heights.

13. The wall surface of claim 12, in which the pattern repeat spacing between the highest of the at least three heights of projections is no greater than the approximate diameter of the streaks.

14. The wall surface of claim 9, in which the repeated pattern of projections comprises projections of at least three different heights and the pattern repeat spacing between the highest projections is greater than the streak diameters, the highest projections being sufficiently higher than the next highest projections to constrain meandering of the streaks spanwise of the surface.

15. The wall surface of claim 9 or claim 14, in which the pattern repeat spacing between the highest projections lies in the range 50 to 100 wall units.

16. The wall surface of claim 9 or claim 14, in which the pattern repeat spacing between the highest projections lies in the range 120–240 wall units.

17. The wall surface of claim 1 or claim 9, in which said projections have heights which, when expressed in wall units, change with distance along the wall surface in the direction of fluid flow.

18. The wall surface of claim 17, in which an increase in the aspect ratio of the projections' transverse cross-section with distance along the wall surface produces the increased height.

19. The wall surface of claim 17, in which the increasing height projections having transverse cross-sections which taper from a base width to a peak, with an aspect ratio that is maintained essentially constant with change of height, whereby the pattern at the upstream end has large spaces between the projections, these spaces progressively narrowing as the projections increase in height in the direction of fluid flow.

20. The wall surface of claim 17, in which the change in height is continuous.

21. The wall surface of claim 17, in which the change in height is accomplished by succeeding bands of projections, each band of different height from the two adjacent ones, the projections of each band having a uniform height, the bands being assembled together to present to the stream a series of projections with progressive step changes in height.

22. The wall surface of claim 21, in which the successive bands of projections have different projection-to-projection pitches.

23. The wall surface of any one of claims 1 or 9, the wall surface having an upstream portion on which a laminar boundary layer is established at predetermined conditions of fluid flow thereover, and a downstream portion on which a transition boundary layer is established at said predetermined conditions, the projections being positioned between and overlapping said upstream and downstream portions of the wall surface such that under said predetermined fluid flow conditions said upstream region of laminar boundary layer flow is extended downstream by interaction of said projections with the laminar boundary layer, thereby to delay the onset of the transition boundary layer.

24. The wall surface of any one of claims 1 or 9, in which at least the larger height projections have side faces that are inclined at an angle that varies over the height of the projections, each said side face having an intermediate region at a lesser steepness than the adjacent regions above and below said region and forming the lower part of a concave profile peak of the associated projection.

25. The wall surface of claim 24, in which the transition to the concave-sided peaks is positioned at or close to the virtual wall height established by the projections.

* * * * *